United States Patent [19]
Blount et al.

[11] Patent Number: 6,070,184
[45] Date of Patent: May 30, 2000

[54] SERVER-SIDE ASYNCHRONOUS FORM MANAGEMENT

[75] Inventors: Marion Blount, Mahopac; Hung-yang Chang, Yorktown Heights; Norman H. Cohen, Spring Valley, all of N.Y.; Richard Allen Floyd; Barron Cornelius Housel, III, both of Chapel Hill, N.C.; David Bruce Lindquist, Raleigh, N.C.; Steve Mastrianni, Unionville, Conn.; Marshall Shapiro; Carl D. Tait, both of New York, N.Y.

[73] Assignee: International Business Machines Corporation, Armonk, N.Y.

[21] Appl. No.: 08/919,913

[22] Filed: Aug. 28, 1997

[51] Int. Cl.[7] .................................................. G06F 15/16
[52] U.S. Cl. ........................ 709/200; 709/202; 709/203; 709/217
[58] Field of Search ........................... 395/200.3, 200.54, 395/200.32; 709/202, 203, 217, 200; 707/104

[56] References Cited

U.S. PATENT DOCUMENTS

| | | | |
|---|---|---|---|
| 4,438,511 | 3/1984 | Baran | 370/19 |
| 4,893,307 | 1/1990 | McKay et al. | 370/94.1 |
| 5,021,949 | 6/1991 | Morton et al. | 364/200 |
| 5,193,162 | 3/1993 | Bordsen et al. | 395/200.08 |
| 5,220,501 | 6/1993 | Lawlor et al. | 364/408 |
| 5,241,625 | 8/1993 | Epard et al. | 395/163 |
| 5,321,542 | 6/1994 | Freitas et al. | 359/172 |
| 5,412,654 | 5/1995 | Perkins | 370/94.1 |
| 5,442,633 | 8/1995 | Perkins et al. | 370/94.1 |
| 5,446,736 | 8/1995 | Gleeson et al. | 370/473 |
| 5,448,561 | 9/1995 | Kaiser et al. | 370/85.1 |
| 5,473,772 | 12/1995 | Halliwell et al. | 395/650 |
| 5,481,721 | 1/1996 | Serlet et al. | 395/700 |
| 5,511,208 | 4/1996 | Boyles et al. | 395/800 |
| 5,572,528 | 11/1996 | Shuen | 370/402 |

(List continued on next page.)

FOREIGN PATENT DOCUMENTS

| | | | |
|---|---|---|---|
| 0 524 123 A2 | 1/1993 | European Pat. Off. | G06F 15/16 |
| 0 665 670 A3 | 1/1995 | European Pat. Off. | H04L 29/06 |
| WO97/15020 | 4/1997 | WIPO | G06F 19/00 |
| WO97/30403 | 8/1997 | WIPO | G06F 17/30 |
| WO97/30538 | 8/1997 | WIPO | H04L 29/06 |
| WO97/30539 | 8/1997 | WIPO | H04L 29/06 |

OTHER PUBLICATIONS

IBM Technical Disclosure Bulletin, Method to Reduce Changed Data Sent Between Computer Systems, vol. 35, No. 1B, pp. 110–112.

Austin, et al., File System Caching in Large Point–to–Point Networks, *Software Engineering Journal*, vol. 7, No. 1, pp. 65–80 (Jan. 1992).

Nelson, et al., Caching in the Sprite Network File System, *Operating Systems Review*, vol. 21, No. 5, pp. 3–4 (1987).

Huizinga, et al., Two–Level Client Caching and Disconnected Operation of Notebook Computers in Distributed Systems, *SIGICE Bulletin*, vol. 21, No. 1, pp. 9–14 (Jul. 1995).

(List continued on next page.)

*Primary Examiner*—Zarni Maung
*Assistant Examiner*—Qvoc-Khanh Le
*Attorney, Agent, or Firm*—Myers Bigel Sibley & Sajovec; Jeanie S. Ray-Yarletts

[57] ABSTRACT

Methods, systems and computer program products which provide for communicating with a web browser executing on a remote/mobile processing system which is temporarily and intermittently connected to a second computer by storing in a persistent request queue at the second computer, a request from the web browser to a server application accessible to the second computer. Also disclosed are methods, systems and computer program products which allow for operation and management of asynchronous operations of a web browser where the operations are carried out by a server-side intercept module.

35 Claims, 9 Drawing Sheets

U.S. PATENT DOCUMENTS

| | | | |
|---|---|---|---|
| 5,572,643 | 11/1996 | Judson | 395/793 |
| 5,574,906 | 11/1996 | Morris | 395/601 |
| 5,581,558 | 12/1996 | Horney, II et al. | 370/401 |
| 5,600,834 | 2/1997 | Howard | 395/617 |
| 5,611,038 | 3/1997 | Shaw et al. | 395/806 |
| 5,673,322 | 9/1997 | Pepe et al. | 380/49 |
| 5,701,451 | 12/1997 | Rogers et al. | 709/200 |
| 5,737,536 | 4/1998 | Herrmann et al. | 395/200.59 |
| 5,751,963 | 5/1998 | Umetsu | 395/200.53 |
| 5,754,774 | 5/1998 | Bittinger et al. | 709/203 |
| 5,764,910 | 6/1998 | Shachar | 395/200.53 |
| 5,774,660 | 6/1998 | Brendel et al. | 395/200.31 |
| 5,829,023 | 10/1998 | Bishop | 711/211 |
| 5,850,517 | 12/1998 | Verkler et al. | 709/202 |
| 5,857,201 | 1/1999 | Wright, Jr. et al. | 709/104 |
| 5,859,971 | 1/1999 | Bittinger et al. | 395/200.33 |
| 5,867,661 | 2/1999 | Bittinger et al. | 395/200.57 |
| 5,870,558 | 2/1999 | Branton, Jr. et al. | 709/224 |
| 5,878,213 | 3/1999 | Bittinger et al. | 395/200.33 |
| 5,928,323 | 7/1999 | Gosling et al. | 709/203 |

OTHER PUBLICATIONS

Abstract, IBM Technical Disclosure Bulletin, Method for Transmitting Only Document Change Data, vol. 27, pp. 844–846 (Jun. 1984).

International Search Report for International Application No. PCT/US96/11555.

Hypertext Transfer Protocol—HTTP/1.1, HTTP Working Group, Berners–Lee, et al.—Internet—Draft (Jan. 19, 1996).

Hypertext Transfer Protocol—HTTP/1.0, HTTP Working Group, Berners–Lee, et al.—Internet—Draft (Feb. 19, 1996).

Basic HTTP; W3Ologo HTTP circa May 3, 1994.

Basic HTTP as defined in 1992; W3Ologo HTTP circa Oct. 7, 1997.

ARTour, IBM Sales Brochure G325–3598–0 printed Sep. 1995.

ARTour, IBM Sales Brochure G325–3595–00, printed Sep. 1995.

IBM ARTour Technical Overview—Release 1; IBM Publication SB14–01100–00 (1995).

Bird, R., Advances in APPN architecture, *IBM Systems Journal*, vol. 34, No. 3, pp. 430–451 (1995).

IBM ARTour Web Express Server Guide, First Edition (Feb. 1997).

IBM ARTour Web Express Server Guide, Second Edition (Jun. 1997).

Berners–Lee, T., et al., *The World Wide Web*, Communications of the Association for Computing Machinery, vol. 37, No. 8, pp. 76–82 (Aug. 1994).

IBM ARTour Web Express Server Guide, First Edition (Feb. 1997).

IBM ARTour Web Express Server Guide, Second Edition (Jun. 1997).

SERVER-SIDE ASYNCHRONOUS FORM MANAGEMENT

FIELD OF THE INVENTION

The present invention relates remote/mobile computing, and more particularly to remote/mobile computing using the web browser/web server communication model.

BACKGROUND OF THE INVENTION

The recent publicity and emphasis on the "information superhighway" has increased awareness and acceptance of the Internet as a mass communication media. This broad based recognition of the Internet as a viable media for communication and interaction across multiple networks has also created a large established user base built upon the Internet standardized protocols for interaction between computer networks.

The paradigm for the Internet is that of a client-server relationship where Internet clients (browsers) communicate with Internet servers. To provide greater access to the Internet the communication protocols and languages utilized by the clients and servers have become standardized. These protocols include the Hyper-Text Transfer Protocol (HTTP), which is the communication protocol used for communications between clients and servers, and the Transmission Control Protocol/Internet Protocol (TCP/IP) the TCP portion of which is the transport specific protocol for communication between computers or applications. Also standardized is the language in which clients and servers communicate which is called Hyper-Text Markup Language (HTML).

In the context of the World Wide Web client/server applications the client may be a web browser which acts as the user interface. The web browser sends user requests to the appropriate web server and formats and displays the HTML data returned from the web server. The web browser also evaluates the HTML data to determine if there are any embedded hyper-link statements in the HTML data which would require subsequent browser requests which would then be initiated by the browser. A web server acts as the server for the client and processes the web browsers requests and returns the requested response as an HTML data portion of a HTTP data stream.

The basic communication structure for an Internet based system is depicted in FIG. 1. In FIG. 1 a web browser 10 communicates with a web server 20 over a communication link 15. This communication link is typically a local area network connection, wide area network connection, a connection over telephone lines or a combination thereof. The web browser 10 communicates with the web server 20 using TCP/IP. For the majority of Internet communications a web browser communicates with a web server using the generic communication protocol HTTP which is transmitted between the web browser and the web server over the TCP/IP link between the web browser and the web server. The actual data transferred between the web browser 10 and the web server 20 are HTTP data objects (e.g. HTML data) as described above. The web server 20 may be a proxy which receives web browser communications from a number of web browsers and routes them to the appropriate server.

The popularity of the web browser/web server and their common information and transport protocols, HTML and HTTP, has lead to rapid acceptance of web technology as a universal interface for network access to information. Furthermore, because the protocols and language for communication between web browsers and web servers are standardized the communication protocols and language will be the same whether a user is using Netscape Navigator™, NCSA Mosaic™, WebExplorer™ or any other web browser as their web browser to access network information. Therefore, the large installed user base for web browsers combined with the connectivity of the Internet and the ease of writing web application servers using the HTTP defined Common Gateway Interface (CGI) make web technology very attractive for a large class of forms-based applications.

At the same time that the Internet was growing in popularity and acceptance, mobile computing was also increasing in popularity. The use of laptops, notebooks, Personal Digital/Communication Assistants (PDAs/PCAs) and other portable devices has lead to an increase in demands for wireless communications. Wireless wide area networks, cellular communications and packet radio, however, suffer from common limitations if used in a web context. The high cost per byte of communications, slow response time, low bandwidth and unreliability all hamper use of wireless technology for the stateless communication protocol of the World Wide Web. Also, because the web protocol is stateless the amount of data per request and the number of communication requests transferred over the wireless connection are larger than would be necessary if the communication were not self contained.

Furthermore, the underlying mechanisms and protocols of Web browsing were developed with a traditional network model in mind. These mechanisms were developed based on the tacit assumption that the computers involved were connected via high-bandwidth, inexpensive, reliable links. However, in contrast to a wired LAN or WAN environment, mobile links are typically low-bandwidth, costly, and unreliable. Some mobile connections are less burdensome than others—for example, a simple dialup modem is both faster and cheaper than packet radio—but all are dramatically slower than their LAN counterparts. Mobile connections are also less reliable: dropped connections are not uncommon due to signal degradation, blockage, and other problems. Thus, applications such as web browsers that were targeted for a LAN environment often perform very poorly in a network-constrained setting.

Furthermore, the mobile environment raises the issue of disconnected operation. Standard Web browsing—as well as many existing networked applications—assume that disconnection is a comparatively rare error case. Operations typically fail when the client is disconnected from the server.

Weak connectivity and the possibility of disconnection lead to yet a third aspect of the mobility problem: the dynamic nature of a user's connectivity. At different times, a single user may be strongly connected (LAN), weakly connected (cellular or other mobile link) or disconnected.

Several factors contribute to poor usability and reduced user productivity when using browsers in a resource-constrained or unreliable communication environment typified by wireless communication. First, the browser protocol is synchronous, which means that users must wait until a request completes before another request can be made. When the delay is long due to slow wireless transmission, congested Internet or intranet traffic, or overburdened Web servers, users may become frustrated and unproductive.

Second, the natural burstiness of the synchronous request/response scheme may become a significant problem over a slow link or over a time cost based link. Over a wired LEN, server response time is usually the primary concern, but in a wireless environment, bandwidth and latency are typically the dominating factors. (Latency on a packet radio network can be on the order of several seconds.) Third, the usual synchronous request/response model does not work at all in the face of voluntary or involuntary disconnection. If a request cannot be satisfied immediately, an error code is typically returned and the user must explicitly retry the request at a later time.

In light of the above discussion, a need exists for improvements in the web browser/web server operation in the mobile computing environment which may be characterized by varying levels of connection performance and reliability.

SUMMARY OF THE INVENTION

In view of the above discussion, it is an object of the present invention to reduce the impact of the synchronous nature of browser communication in a weakly connected or disconnected environment.

A further object of the present invention is to overcome browser limitations in a remote or mobile environment where transmission time, latency or other communication limitations reduce responsiveness of browser/server communications.

Still another object of the present invention is to provide browser functions in a mobile environment where the nature of the environment is transparent to a user.

Still another object of the present invention is to make connection status transparent to browsers such that existing browsers may be utilized in a mobile environment.

These and other objects of the present invention are provided by methods, systems and computer program products which provide for communicating with a web browser executing on a remote/mobile processing system which is temporarily and intermittently connected to a second computer by storing in a persistent request queue at the second computer, a request from the web browser to a server application accessible to the second computer. An interim response is provided to the web browser in response to the request from the client application. The stored request is provided to the server application and a response is received from the server application. The received response may then be provided to the web browser executing on the remote/mobile processing system.

By storing requests in a request queue at the second computer (server side) and providing an interim response to the web browser, asynchronous operation of the web browser may be achieved. Furthermore, by storing the requests at the server side of the communication, the requests may be processed after the connection is terminated with the remote/mobile processing system. Thus, the present invention overcomes the limitations of weak connectivity. Furthermore, in slow speed environments, the present invention allows a user to upload several requests without waiting for responses to the requests and to continue working while the requests are processed in the background.

In a particular embodiment of the present invention, it is determined if the request received from the browser is a delayed processing request. If the request is not a delayed processing request, then the request is not stored but is processed directly and the response provided to the browser.

Once the request is received and stored in the request queue at the second computer, the remote/mobile data processor may disconnect from the second computer. In such a case, the remote/mobile data processing system will reconnect to the second computer to receive the response to the stored request. In a particular embodiment, a list of stored requests may be provided to the web browser for presentation to a user. The user, through the web browser may request for a selected one of the stored requests in the list of stored requests. The associated response to the selected one of the list of stored requests may then be provide to the web browser for presentation to the user. Furthermore, the user may be notified of the availability of the received response subsequent to the response being received by the second computer. The response may then be provided to the web browser if the user requests the response.

Because multiple connections may be used in sending and receiving requests, a further embodiment of the present invention establishes a persistent request queue associated with a user identifier. In such a case, when the remote/mobile data processor reconnects with the second computer, the remote/mobile data processing system may provide a user identifier to the second computer. The received response to a request from the persistent request queue associated with the received user identifier may then be provided to the remote/mobile data processing system. Thus, by associating a user identifier with a request queue, multiple users may connect to the same second computer and access only their request queue. Accordingly, a secure response and request queue may be provided so as to prevent unauthorized access to a request queue or responses associated with a request queue.

In another embodiment of the present invention, a received response is parsed to determine if at least one request is embedded in the received response. If a request is embedded in the received response, then the embedded request may be provided to a server specified by the embedded request. The response to the embedded request is received and stored at the second computer. The stored response is then associated with the request stored in the persistent request queue. The stored received response and the stored response to the embedded request may then be provided to the web browser.

In a further embodiment of the present invention, the response to a request is stored at the second computer and associated with the stored request in the persistent request queue associated with a user identifier. Thus, a plurality of persistent request queues may be established wherein each of the persistent request queues is associated with a user identifier. This allows for storing requests from a plurality of web browsers in the plurality of persistent request queues such that requests from a user of a web browser are stored in the persistent request queues associated with the user identifier of the user. The plurality of requests may then be provided to associated web servers and a plurality of responses received from the associated web servers. The received plurality of responses may be provided to the plurality of web browsers such that a response to a request is provided to the web browser from which the request was received.

In yet another embodiment of the present invention, a web browser executing on a remote/mobile processing system which is temporarily and intermittently connected to a second computer communicates by storing in a persistent request queue at the second computer, a request from the web browser to a server application accessible to the second computer. A client identification is associated with the stored request and the stored request is provided to the server application. A response is received from the server application and stored in a server-side cache resident on the second computer. The stored received response is then associated with the stored request and provided to the web browser associated with the client identification associated with the stored request.

Another aspect of the present invention, provides the stored request during a subsequent connection of the web browser associated with the client identification. Furthermore, a modification of the request may be received prior to the stored request being provided to the server application. The request stored in the request queue may be modified to replace the stored request with the modified request.

In another embodiment of the present invention, it is determined if a request received from the browser is a delayed processing request. If the request is a delayed processing request, the request is stored in the request queue and processed accordingly.

In another embodiment of the present invention, a plurality of responses from servers are associated with a single entry in the persistent request queue. The plurality of responses associated with the single entry in the persistent request queue are provided to the remote/mobile data processing system in response to a request for the single entry.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which referred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described herein with respect flowchart illustrations of embodiments or aspects of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 1:
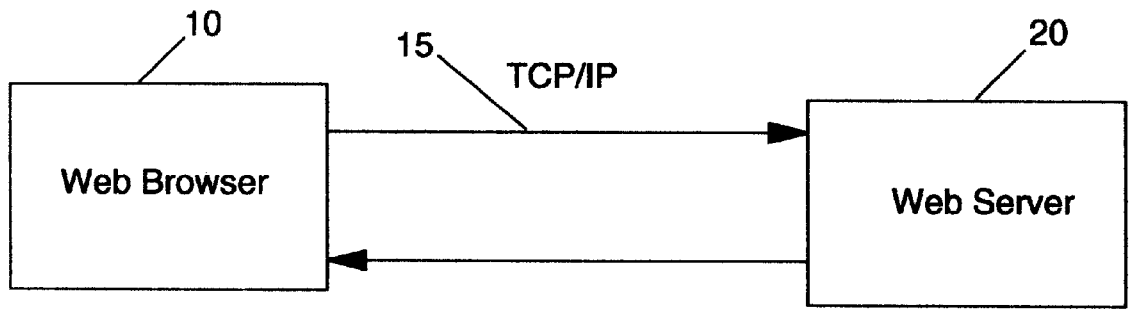
FIG. 1 is a block diagram of a typical web browser/web server system.
Figure 2:
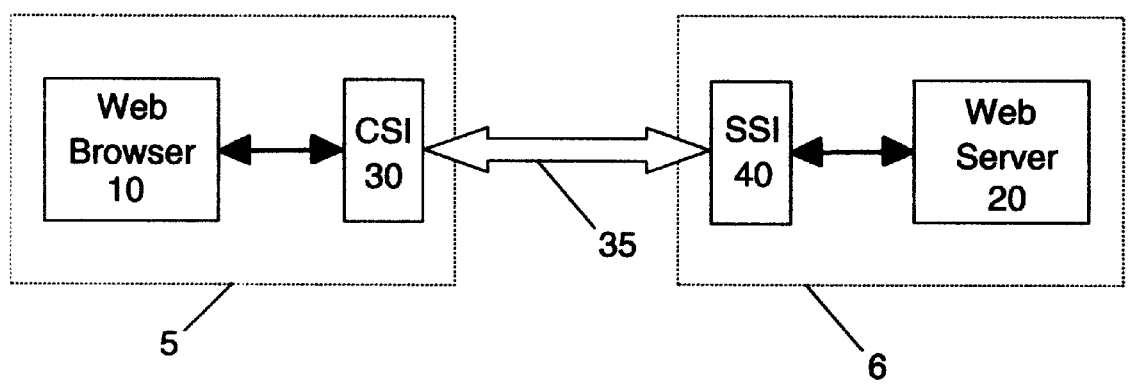
FIG. 2 is a block diagram of a web browser/web server system according to one embodiment of the present invention utilizing a client intercept and a server intercept.

FIG. 2 illustrates one embodiment of the present invention. As seen in FIG. 2, a web browser 10 communicates with a client-side intercept module 30. The web server 20 communicates with a server-side intercept module 40. The client-side intercept module 30 then communicates with the server-side intercept module 40 over the communication link 35. The web browser 10 and the client-side intercept module 30 may be contained in a first computer 5. The server-side intercept module 40 and the web server 20 may be contained in a second computer 6. The first computer 5 and the second computer 6 communicate over external communication link 35. The first computer 5 is preferably a remote/mobile data processing system. As used herein, "remote/mobile" means "temporarily and intermittently linked", wherein temporarily means "lasting for a limited time" and intermittently means "coming and going at intervals, not continuous, or occasional." Remote/Mobile data processing systems may also include data processing systems which remotely access other systems such as over a network.

Preferably, the web browser 10 is an Internet web browser utilizing hypertext transfer protocol (HTTP) and hypertext markup language (HTML) to communicate with an Internet web server 20 which also uses HTTP and HTML. In operation, the web browser 10 would output an HTTP data stream which is intercepted by the client-side intercept module 30. The intercept of the HTTP data stream by the client-side intercept module 30 may be accomplished through the use of the TCP/IP loop-back feature where the client-side intercept module 30 resides at an IP address having a network number of 127, such as 127.0.0.1. The client-side intercept module 30 then converts or transforms the HTTP data stream into a client/server specific protocol and transmits the client/server specific data stream onto the external communication link 35. The server-side intercept module 40 receives the client/server specific data stream and reconstructs the original HTTP data stream corresponding to the web browser originated communication. This reconstructed HTTP data stream is then transferred to the web server 20. The web server 20 responds to the HTTP data stream in the normal manner of an Internet web server. As will be appreciated by one of skill in the art, the web server 20 may also be a proxy which allows multiple browsers to connect to the Internet.

When information is received by the web server 20 for transmission to the web browser 10, for example, in response to a browser request for a specific URL home page, the web server 20 outputs an HTTP data stream corresponding to the communication to be sent to the web browser 10. This web server originated communication is intercepted by the server-side intercept module 40 and transformed by a client/server specific data stream. The client/server specific data stream corresponding to the web server originated communication is then sent on the external communication link 35 from the second computer to the first computer. The client/server specific data stream is received by the client-side intercept module 30 and the original HTTP data stream corresponding to the web server originated communication is rebuilt and provided to the web browser 10.

In a particular embodiment of the present invention, the external communication link 35 is a wireless communication link. In such a case, in order to obtain system performance which is acceptable to users, it is desirable to reduce the amount of communication over the external communication link 35 both in the frequency of the communications and in the amount of information which must be transferred over the communication link 35. Accordingly, the present invention preferably utilizes caching, differencing, and protocol reduction techniques to minimize the amount of communication required over the external communication link 35. These techniques are accomplished by converting the stateless or stochastic protocols of HTTP into a client/served specific protocol which utilizes information specific to the client and the server to reduce the amount and frequency of communications.

In operation, the client-side intercept 30 and the server-side intercept 40 are transparent to both web browsers and web (proxy) servers and, can therefore be employed with any web browser. Both the server-side intercept 40 and client-side intercept 30 cache graphic and HTML objects. If the URL of a browser request specifies an object in the client-side intercept's cache, it is returned immediately as the browser response. The caching functions guarantee cache integrity within a client-specified time interval. The server-side intercept cache is populated by responses from the requested web servers. If a requested URL received from a client-side intercept is cached in the server-side intercept, it is returned as the response to the request.

The present invention preferably utilizes a virtual socket system such as is illustrated in commonly assigned U.S. patent application Ser. No. 08/601,804 entitled CLIENT/SERVER COMMUNICATION SYSTEM, Attorney Docket No. RA895-0154 the disclosure of which is incorporated herein by reference as if set forth fully. The present invention also preferably utilizes the data reduction techniques described in commonly assigned U.S. patent application Ser. No. 08/601,753 entitled TIME COHERENT CACHING SYSTEM, Attorney Docket No. RA9-95-086 and in commonly assigned U.S. patent application Ser. No. 08/601,903 entitled DIFFERENCING COMMUNICATION SYSTEM, the disclosures of which is incorporated herein by reference as if set forth fully.

While the present invention has and will be described with respect to a single web browser application and a single web server application, as will be appreciated by those of skill in this art, the benefits and advantages of the present invention may also be achieved with multiple web browsers associated with a single web server. Thus, the methods, apparatus and program products of the present invention in connection with multiple browsers each communicating with a client-side intercept module and these client-side intercept modules would then communicate with the server-side intercept module of the web server or web proxy.

Furthermore, while the present invention is described herein with respect to both a client-side intercept module and a server-side intercept module, as will be appreciated by those of skill in the art, only a server-side intercept is required by the present invention. Thus, the present invention should not be construed as limited to systems having both a client-side and a server-side intercept module.

The present invention also provides for asynchronous request and response processing which permits a user to continue making requests even though previous requests have not completed. Preferably, the asynchronous request and response processing is coordinated between both the client-side intercept and the server-side intercept to provide a high level of flexibility to a user and to achieve performance advantages. Requests are recorded internally for background processing by the client-side intercept, the server-side intercept or both. When requests complete, the results are saved and status is updated asynchronously. The user is (optionally) notified when requests complete and may switch to a status page to review the status of one or more requests. The status entry for each request conveys the state of the request (not started, in process, or complete) and contains a link to the response page if the request has completed.

The present invention also provides for disconnected operation when the remote/mobile data processing system is not linked to a computer with access to a server application. Users can operate in either synchronous or asynchronous mode. In either case, when the loss of a connection is detected, or if communication is not possible (e.g., out of signal range), requests may be queued and held for later processing or requests may be queued to the server-side intercept for processing during the disconnected time and retrieval of responses when reconnected. This capability enables a user to continue to be productive offline. These operations will now be described with respect to FIG. 3 and FIG. 4 and the flow chart illustrations of FIGS. 5 through 10.

Figure 3:
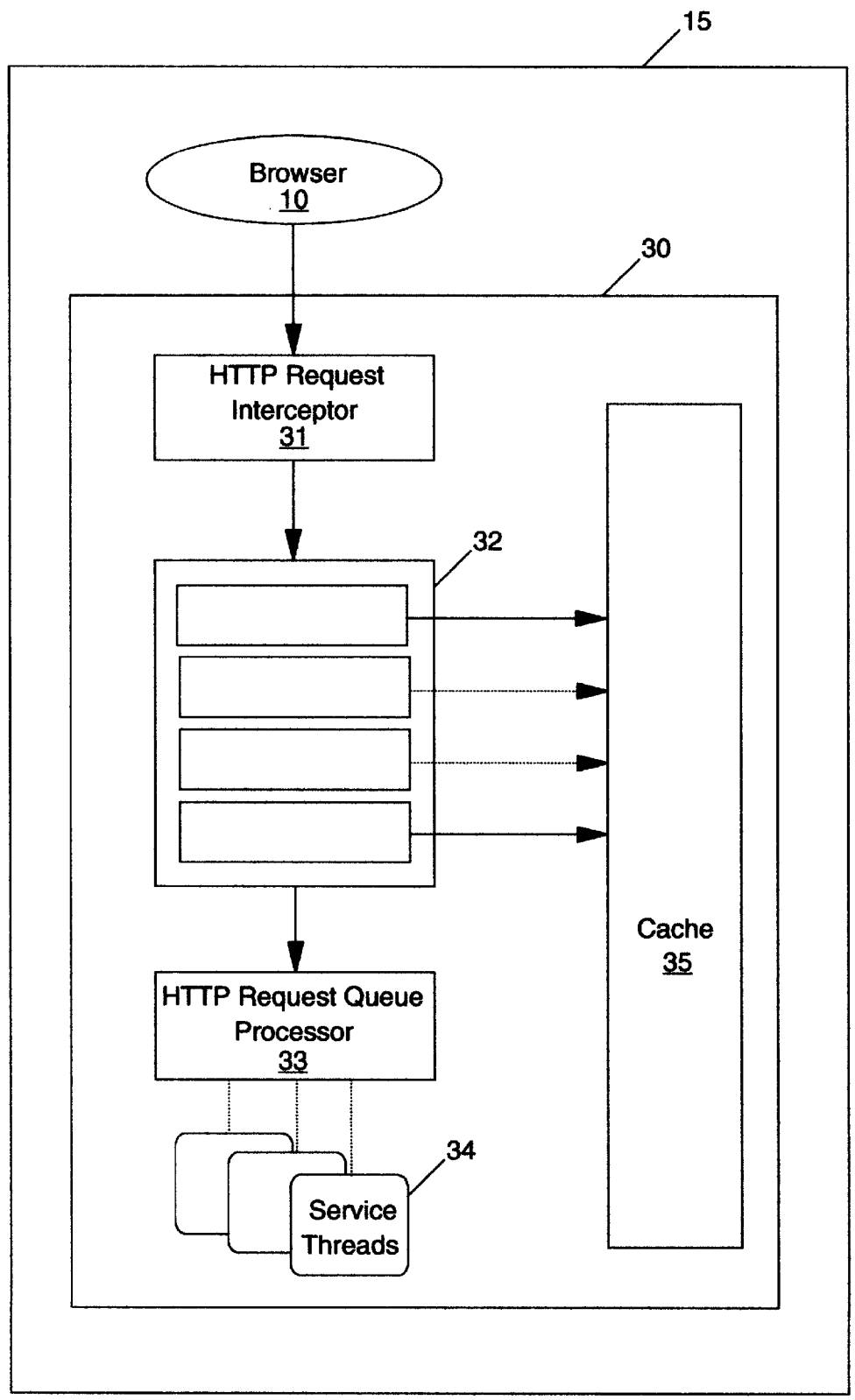
FIG. 3 is a block diagram of a client-side intercept module according to the present invention.

FIG. 3 illustrates a remote/mobile data processing system utilizing a particular embodiment of the present invention. As seen in FIG. 3, a remote/mobile data processing system 5 includes an application such as a web browser 10 executing on the remote/mobile data processing system 5. Requests from the browser 10 are intercepted by an HTTP request interceptor 31 and placed in a request queue 32. The requests in the request queue 32 are processed by a HTTP request queue processor 33 which carries out the requests when a connection is established to a second computer having access to the server specified in the requests. When these requests are processed a service thread 34 is initiated for each request to carry out the request. Responses to the request are placed in the cache 35 and associated with the request from the request queue which generated the request. Such association is illustrated as a cashed line in FIG. 3. The solid line in FIG. 3 from entries in the request queue to the cache represents the association of the request entry with the form used to create the request. Such an association allows for editing of requests by a user even after the requests have been generated. Optionally, both the requests and the responses may be associated with the entries in the queue so that both the request and the response may be provided to a user.

The request queue 32 is a list of requests that have been received from the browser by the HTTP Request Interceptor 31, along with status and control information. Each request element includes all of the information received from the browser (the HTTP headers and any body). This allows the request to be replayed to the network at a later time. Each request element also holds state information associated with the request. This includes a summary of the progress that has been made in processing the request, and a list of remaining work to be done.

Special processing instructions may also be associated with a request in the request queue. For example, in a wireless environment, it is usually too expensive to download graphics embedded in a page. If graphics have been suppressed for this request, this processing control information will be included in the request element. The request queue persists across client sessions.

Internally, a request consists of a set of attributes. Each attribute is a name-value pair. When the request is created, it is given attributes that contain the browser request. As processing proceeds, attributes are added describing the progress, any status information returned from the browser, and so on. Some attributes, such as the progress indication, are per request. Attributes may also be per queue, and in this case control processing for all elements added to the queue. Per-queue attributes are used to support multiple queues that handle requests in different ways, based on their source or the characteristics of the request. Thus, according to the present invention, more than one request queue may be created and requests may be automatically sorted into the appropriate queue when they are received by the client-side intercept or they may be manually sorted by user input.

Because the present invention allows for off-line processing using applications such as a browser which were designed for synchronous on-line processing, disconnected and asynchronous operations require new user interfaces. Thus, according to the present invention, if a user's request can be satisfied from the cache at the client-side, the response may be provided immediately and the standard browser interface remains unchanged. On a cache miss, however, the browser's semantics may be extended with mechanisms and interfaces associated with the off-line processing of the present invention.

Because the browser is an immutable piece of code with respect to the present invention, a stand-in page may be returned whenever the remote/mobile data processing system is operating asynchronously or disconnected from the second computer and cannot satisfy a user's request from the cache or if no client-side intercept is present. This page contains an explanation of what has happened—"Your request has been queued for later processing"— and, if requested, displays the current status of all pending requests. Note that as far as the browser is concerned, this stand-in page is the response to the request. In other words, the browser retains the request/response mechanism, while the intercept module utilizing the present invention handles the details of responding to the request. Furthermore, the same mechanism may be utilized for both disconnected and asynchronous requests in that an informational page is returned to the browser as the response to the request.

Alternatively, an option to return to the current page rather than being presented with an intermediate acknowledgment may be utilized. This option may be implemented by returning code 204 to the browser. From the user's point of view, a link is clicked but the browser remains on the same page, however, the intercept module according to the present invention queues the request in the background.

Figure 4:
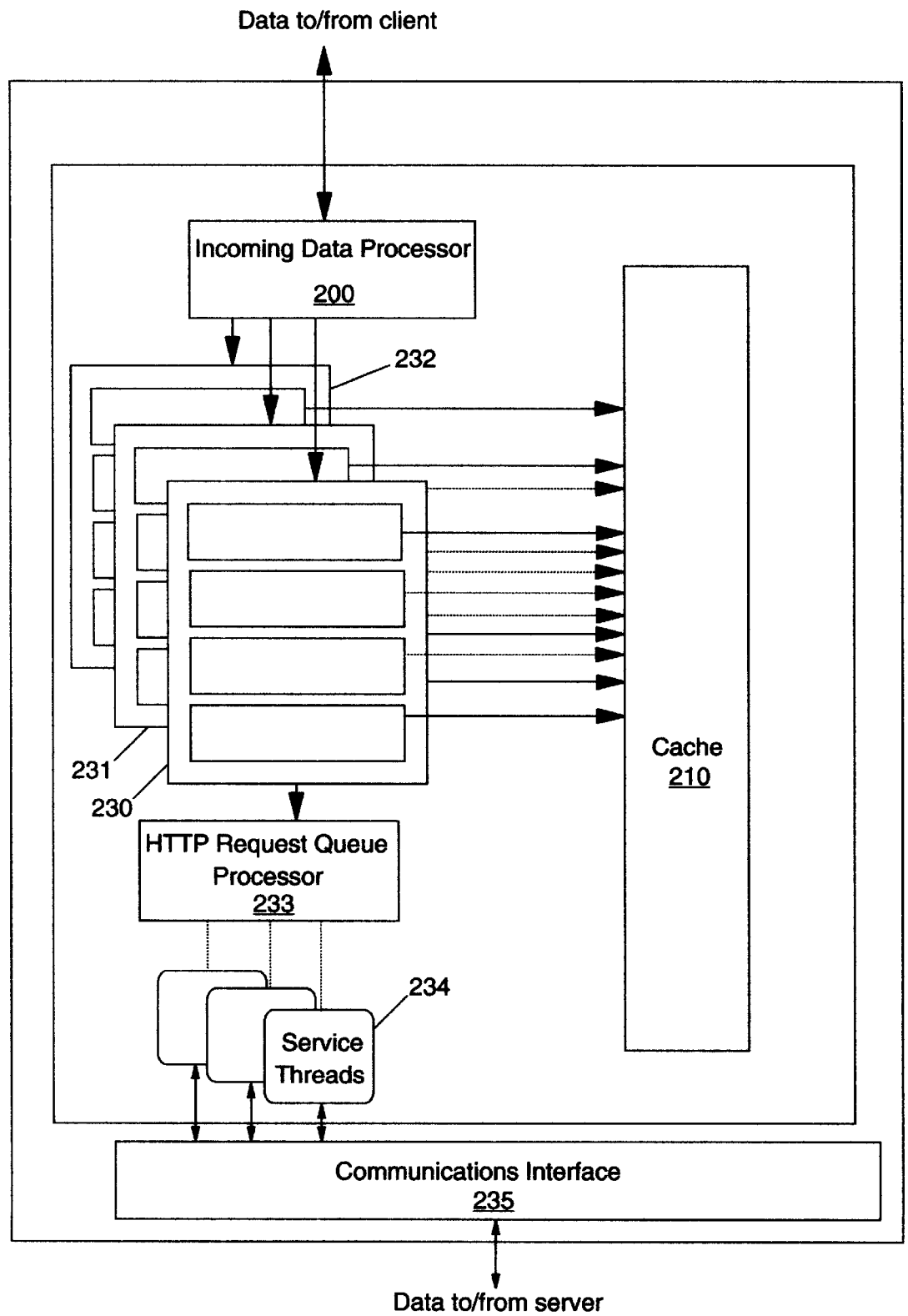
FIG. 4 is a block diagram of a server-side intercept module according to the present invention.

FIG. 4 illustrates one embodiment of a server-side intercept module 40 according to the present invention which may reside on the second computer 6 of FIG. 2. Communications from the client-side intercept module 30, or optionally, directly from a browser 10, are received by an Incoming Data Processor 200 and selectively placed in a request queue 230. Because a server-side intercept module may receive communications from a number of client-side modules or browsers, the server-side intercept module preferably maintains a request queue for each client utilizing asynchronous processing. The request queues associated with differing clients are illustrated in FIG. 4 as queues 230, 231 and 232. These request queues may be structured in the same manner as request queue 230 only with different client identification associated with the requests in the queues.

The requests in the request queues 230, 231 and 232 are processed by a HTTP request queue processor 233 which carries out the requests when a connection is established to a second computer having access to the server specified in the requests(i.e. a proxy) or directly to the server. When these requests are processed a service thread 234 is initiated for each request to carry out the request. Responses to the request are placed in the cache 210 and associated with the request from the request queue which generated the request. Such association is illustrated as a dashed line in FIG. 4.

The solid line in FIG. 4 from entries in the request queue to the cache represents the association of the request entry with the form used to create the request. Such an association allows for modification or cancellation of requests by a user utilizing a server-only configuration even after the requests have been generated. Optionally, both the requests and the responses may be associated with the entries in the queue so that both the request and the response may be provided to a user.

The request queue 230 is a list of requests that have been received from the client-side intercept or browser by the incoming data processor 200, along with status and control information. Each request element includes all of the information received from the browser (the HTTP headers and any body). This allows the request to be replayed to the network at a later time. Each request element also holds state information associated with the request. This includes a summary of the progress that has been made in processing the request, and a list of remaining work to be done.

The same request queue entry format may be utilized by the client-side as is discussed above for the server-side intercept. However, when the requests are transferred to the server-side intercept module, a request ID, which may be generated locally by a client, is associated with the request. Alternatively, when a connection is established a user identification could be established for the duration of the connection. Thus, user ID would be associated with all requests received from that connection. Since disconnection during a request is allowed, different sockets may be involved during different processing phases. By attaching a clientID/requestID pair to each request before transmitting it to the server-side intercept, delivery of results can eventually be coordinated independent of socket connection. The requestID should also be recorded on the client-side for requests sent to the server-side intercept for processing so that they can later be paired up with results. By making the clientID secure, other clients' requests remain inaccessible despite being stored at the server-side intercept module.

In operation, when a user is ready to disconnect and wants the server to process pending requests during disconnection for later retrieval, the client invokes a command which transfers requests to the server-side intercept for processing while disconnected. Such a command may be a client-side API flush() command. The API flush() command sends queued requests to the server for processing on the server-side of the communication link. Transferred items may be marked as flushed in a client request queue, using a name/value pair. There are at least three reasonable forms of the flush() function:

flush() transfer all items not marked as held (default);
flush(all) transfer all items, including held ones; and
flush(item) transfer a specific item.

Held requests (i.e. requests which are designated to be processed at a later time specified by a user) may also be transferred to the server-side for disconnected processing, however, the main reason for holding requests is to defer transfer of the results until sufficient bandwidth is available. Disconnected processing of held requests may not be desirable because the user may not request the results for a long time. Thus, server resources have been consumed in processing the request and storing the results which are not required.

Alternatively, in a browser to server-side intercept configuration, all requests which are not satisfied from the server-side intercept, could be queued at the server-side intercept. Thus, if an intermittent connection failure occurs, the requests may continue to be processed by the server-side intercept while the browser is disconnected. Such a system also has the advantage of keeping the connection between the browser and the server-side intercept fully utilized because dead time on the communication link would be reduced once a queue of responses to be provided to the browser was established.

Changes to a request stored at the client-side may also be taken into account by the present invention. If a particular item has been queued at the server-side intercept, any changes to that item in a client request queue may be propagated to the server. For example, if a user deletes a flushed request from the client request queue, then the server-side intercept should be informed so that processing can be stopped (if necessary), pending results discarded, and the item removed from the clients' request queue at the server-side. Similarly, if a flushed item's status changes to held or unheld, the server-side request queue should be told so that it can cease or begin processing as necessary. Thus disconnected, it may be beneficial to log mutating operations to flushed items at the client-side so that they can be replayed immediately upon reconnection to the server-side intercept module.

Once server-side processing results in a response, propagating data back to the client may be rule-based. Blindly transmitting responses to disconnected requests to the client when it is next connected is undesirable. The client may be in the midst of doing something of high priority over a low-bandwidth link, and the user would prefer that the first connection time not be spent transmitting responses to old requests. Therefore, a set of configurable rules and functions may be provided to help the client optimize data transfer.

One such function may be a GetDigest() function. GetDigest() returns a brief summary of the information that has accumulated in the requested server-side queue for this client. Thus, the following information may be provided in response to a GetDigest()function include URL, title, size, time completed and status of request. Status returned in response to a GetDigest() function call may indicate completed, pending, held, etc. Thus, the status may indicate how far the server-side intercept has gotten in processing the request. The client can use the digest to decide how to proceed. The following sync() functions may be provided corresponding to the flush() operations described above to allow retrieval of the saved responses:

| | |
|---|---|
| sync( ) | get responses to all non-held items (default); |
| sync(all) | get responses to all items, including held ones; and |
| sync(item) | gets the response to a specific request. |

In addition to these explicit requests, the user can arrange for automatic synchronization while connected or in the process of reconnecting:

| | |
|---|---|
| GetPrefs( ) | returns the current list of this client's preferences; |
| SetPrefs(list) | defines a new list of preferences; and |
| UpdatePrefs(list) | updates only the specified preferences. |

The preference list may consist of a sequence of name/value pairs specifying the rules under which data should be automatically transferred. Some of the attributes might include priority, size, source, etc. Thus, asynchronous operation based upon server-side processing may be managed by client-side interaction which may include a combination of user directed actions as well as automatic transfers.

Figure 5:
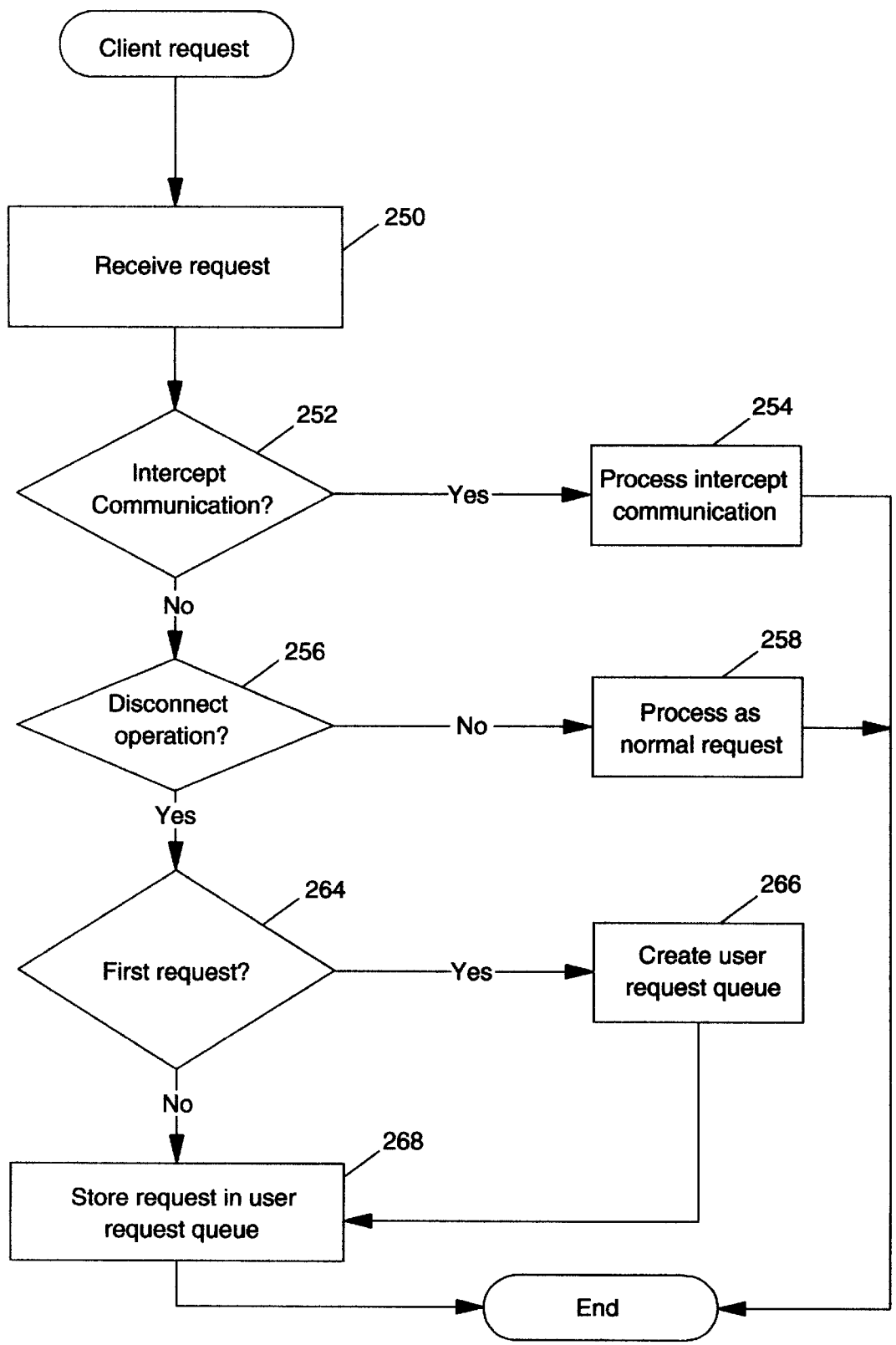
FIG. 5 is a flow chart illustrating the operation of a server intercept module according to the present invention in receiving a request from a client-side intercept module.

Operation of the server-side intercept will now be described with respect to FIG. 5, FIG. 5a and FIG. 6. FIG. 5 illustrates the operation of a server-side intercept module when the module receives a transmission from a client-side intercept module. As seen in block 250 the server-side intercept receives a request from the client-side intercept module. This information may generally take two forms: a standard browser request, or a request handled by the server-side intercept itself (see, e.g. the GetDigest() or SetPrefs() so functions discussed above). Thus, the server-side intercept determines if the intercepted transmission is a request to a server or to the server-side intercept (block 252) and, if the request is a request to the server-side intercept it processes the request accordingly (block 254). Examples of the types of intercept communications are provided above.

If the intercepted transmission is not an intercept communication to the server-side intercept module itself, then the server-side intercept module determines if the request is a request for disconnected operation to be processed by the server-side intercept module (block 256). If the request is not for disconnected operation then the request is processed as any other request (block 258). The server-side intercept also determines if the request is the first request from a client (block 264) and if so, then a request queue is created for the user (block 266) which includes client identification (client ID) so that subsequent communications may be stored in the appropriate queue and to allow for security so that a user's requests and responses will not be provided to unauthorized users. After creation of a request queue or if a queue already exists, the request is stored in the client's request queue (block 268) and processed offline. The offline processing may be the same as that for the client-side intercept described below.

Figure 5A:
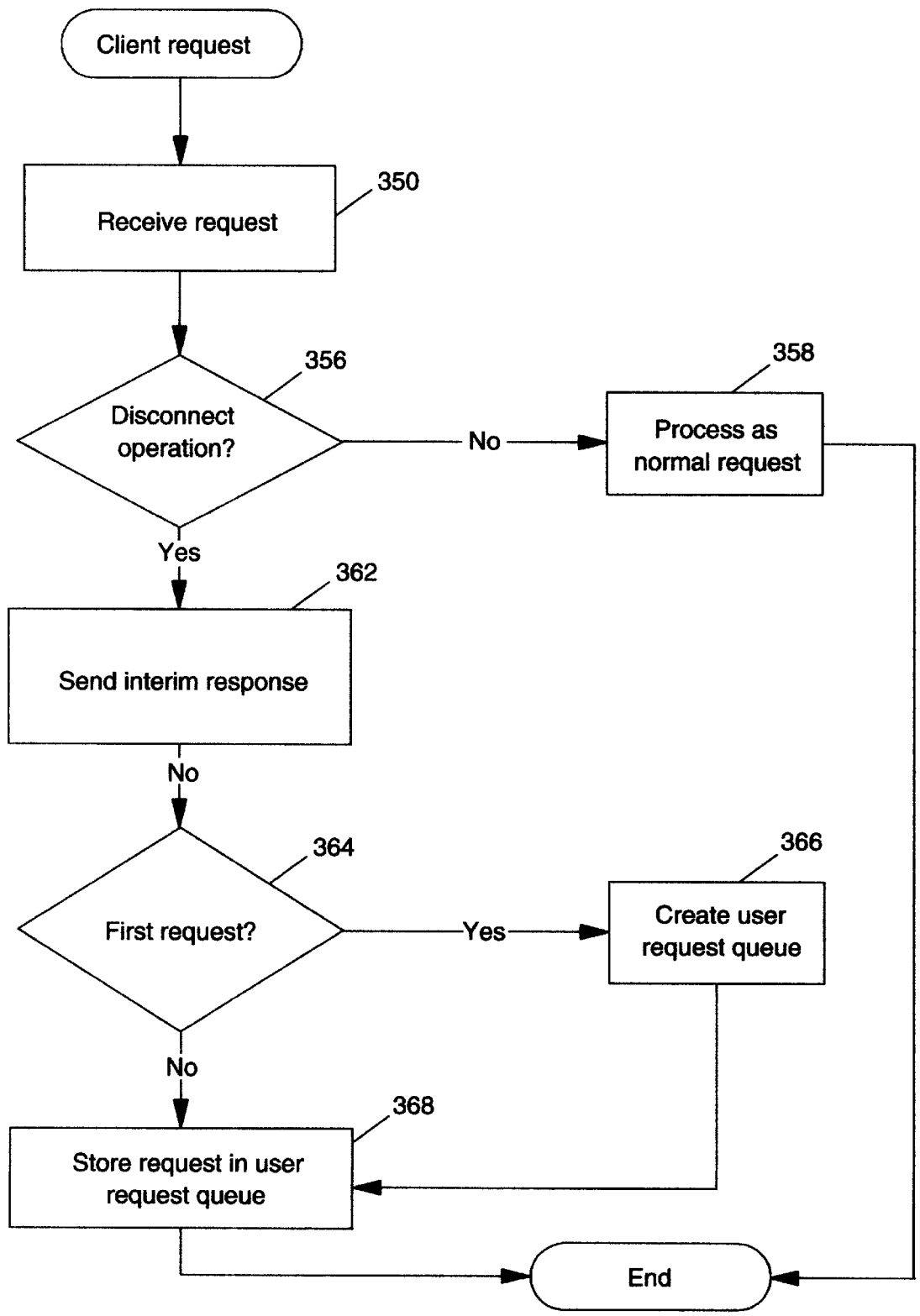
FIG. 5a is a flow chart illustrating the operation of a server intercept module according to the present invention in receiving a request from a client.

FIG. 5a illustrates the operation of a server-side intercept when a client-side intercept is not present and the server-side intercept communicates with the browser (the server-side only case). As seen in FIG. 5a, the server-side intercept module receives the request from the browser (block 350). The server-side intercept then determines if the request is deferred (i.e. the request is for disconnected operation) (block 356). Alternatively, in the server-side only case all requests could be treated as deferred and queued at the server-side intercept module. In any event, if the request is not for deferred operation, then the request is processed normally (block 358). However, if the request is for disconnected processing, then for the browser to proceed, it needs a corresponding response. Thus, the server-side intercept may provide an interim response to the browser (block 362). The interim response may be as simple as a page indicating that the request was received and will be processed offline or it may be as complex as providing the complete status of all pending offline processed requests.

In the server-side only case, the server-side intercept also determines if the request is the first request from a client (block 364) and if so, then a request queue is created for the user (block 366) which includes client identification (client ID) so that subsequent communications may be stored in the appropriate queue and to allow for security so that a user's requests and responses will not be provided to unauthorized users. After creation of a request queue or if a queue already exists, the request is stored in the client's request queue (block 368) and processed offline. The offline processing may be the same as that for the client-side intercept described below.

Figure 6:
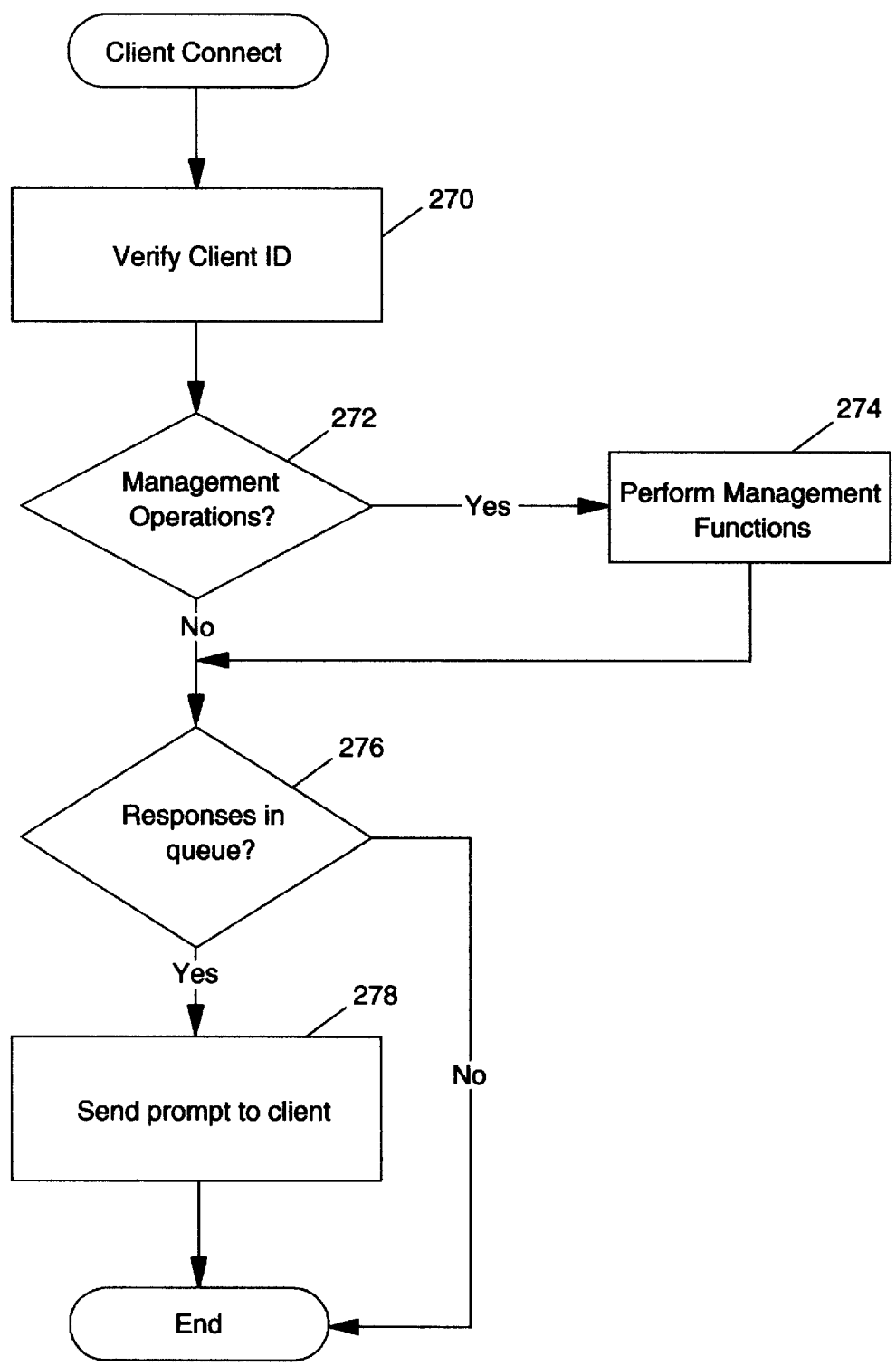
FIG. 6 is a flow chart illustrating the operation of a server intercept module according to the present invention in connecting to client.

FIG. 6 illustrates the operation of a server-side intercept module when a client using asynchronous server-side processing connects to the module. FIG. 6 generally describes the operation of the server-side intercept module for both the client-side/server-side case and the server-side only case. However, as will be appreciated by those of skill in the art, in the server-side only case the presentation of information to the client should be in a format which may be interpreted by the web browser, whereas in the client-side/server-side case the information may be provided in any suitable manner which is may be itnerpreted by the client-side intercept module for translation into a format which may be interpreted by the browser communicating with the client-side intercept module.

As seen in FIG. 6, the client ID of the client is confirmed (block 270)and the server-side intercept determines if any management operations associated with the client's queue are specified by the client (block 272). If so, the management functions are performed (block 274). These management functions may include setting user preferences or updating the queue to reflect modifications made to requests in the queue while the client was disconnected as discussed above.

In addition to performing any management functions, the queue associated with the client ID is examined to determine if any entries exist in the queue (block 276). If entries exist in the queue a prompt may be sent to the client (block 278) to notify the client that there are entries in the queue. This prompt may be complex or simple and may be specified by user preferences. The user may then respond to the prompt in the manner they deem appropriate and the entries in the queue processed accordingly. For example, the user could request that all completed requests be sent to the browser. Alternatively, such operations could be delayed to a later connection or until later in the existing connection.

Furthermore, the responses associated with a user identification could by associated with each other such that they could be provided to the client-side intercept or to a browser as a block based upon a single user request. In such a case, the server-side intercept would construct and associate the information with, for example, a single entry in the request queue, such that the single entry represents multiple responses. Then, when the entry is requested the multiple responses are sent as a group to the client. The browser could then be used to navigate through the chained responses. Thus, the server-side intercept could create a single entry in the request queue that provided multiple responses to the browser. Furthermore, the use could specify which responses were to grouped as a block, thus allowing a user to control how the responses would be received by the web browser.

Figure 7:
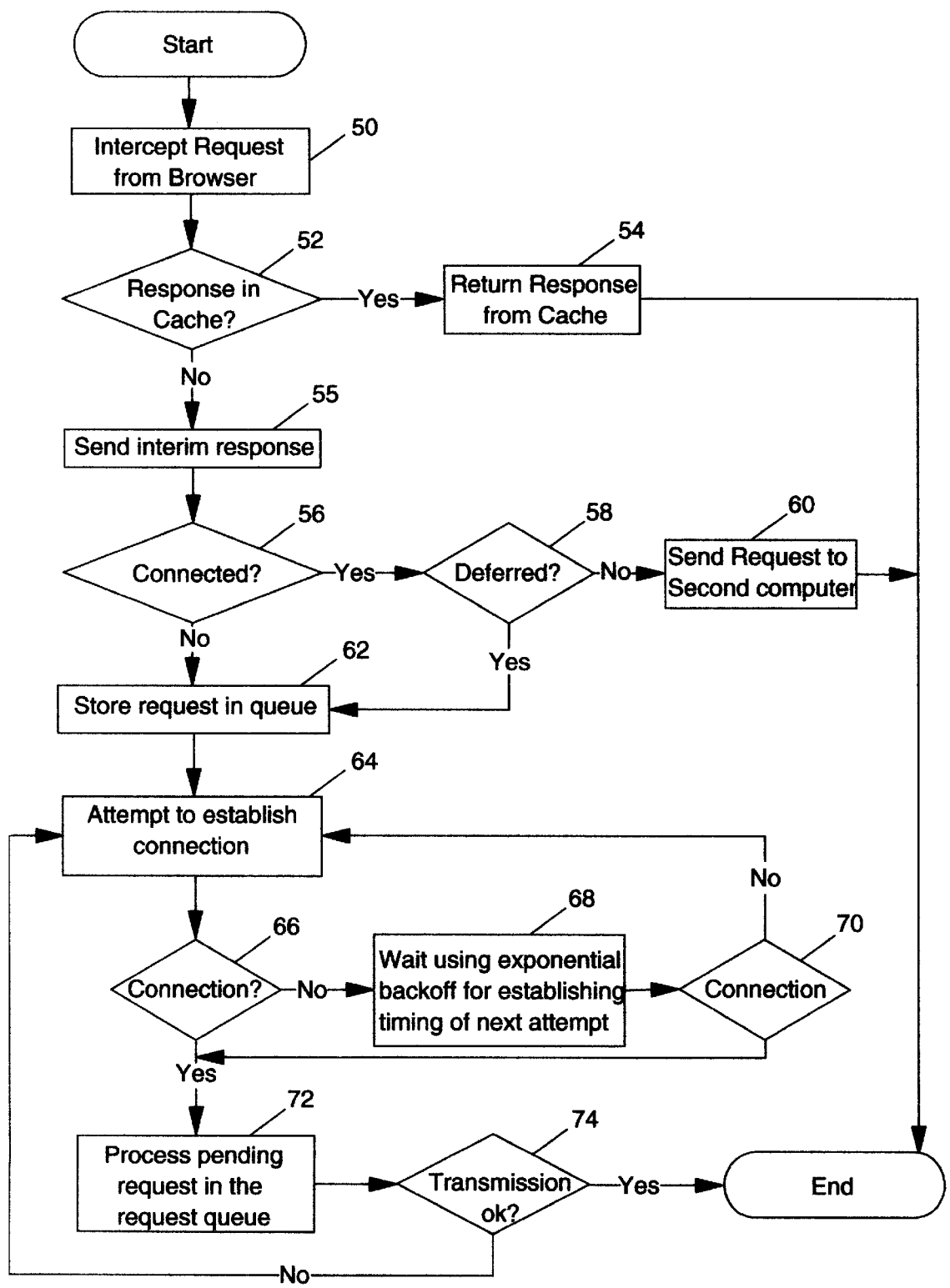
FIG. 7 is a flow chart illustrating disconnected or deferred processing operations according to one aspect of the present invention.

FIG. 7 illustrates the operation of a client-side intercept utilizing the present invention. As seen in FIG. 7, the client-side intercept 30 intercepts a request from browser 10 (block 50). The client-side intercept then determines if the response to the request is in the cache (block 52) and if it is the cached response is returned to the web browser (block 54).

If the response is not cached, then the client-side intercept determines if the data processing system is connected to the second computer for access to the server (block 56). If the data processing system is connected then, if requests are not deferred (block 58), the request is sent to the second computer (block 60). However, if the data processing system is either not connected or request processing is deferred, the request is stored in a request queue and an interim response is provided to the browser as the response to the request (block 62).

Processing of queued requests is handled by threads that run independently of any other activity in the intercept modules according to the present invention. Requests on the queues are usually handled on a first-in, first-out (FIFO) basis. However, selected requests may be marked as held, all new requests should be held (see block 58). This allows the user to indicate that processing on these requests should be deferred until a later time, even if a connection is available. For example, some requests may be too expensive to handle on a particular link, and so the user would prefer to defer processing them until a LAN or dialup connection is available. The hold attribute is also applied to any outstanding queued requests remaining when the client is first started. This avoids surprises when switching from an inexpensive link to a potentially much more expensive wireless link.

As is seen in FIG. 7, the first step in handling a queued request is acquiring a connection to the second computer with access to the server of the request (block 64). An attempt is made to get a connection when a request is first received and, if a connection is not established (block 66), attempts will continue until a connection is made, either by the queue processor or due to other activity (block 70 and block 64). An exponential backoff procedure is used to control the delay between connection attempts (block 68). Thus, the time between attempts to connect increase as the number of attempts increases. This backoff procedure provides responsiveness when communication failures are transient without burdening the network when the failures are long term.

Once a connection is established, the information originally saved from the browser and stored in the request queue is used to reconstitute the request and the request is sent to the second computer (block 72). At this point the request appears to a server as if it came directly from the browser. If the request fails due to failures in the wireless link (block 74), subsequent attempts are made at later times. Retrying requests transparently masks transient communications failures. Other types of failures may also be recorded for later return to the user.

Figure 8:
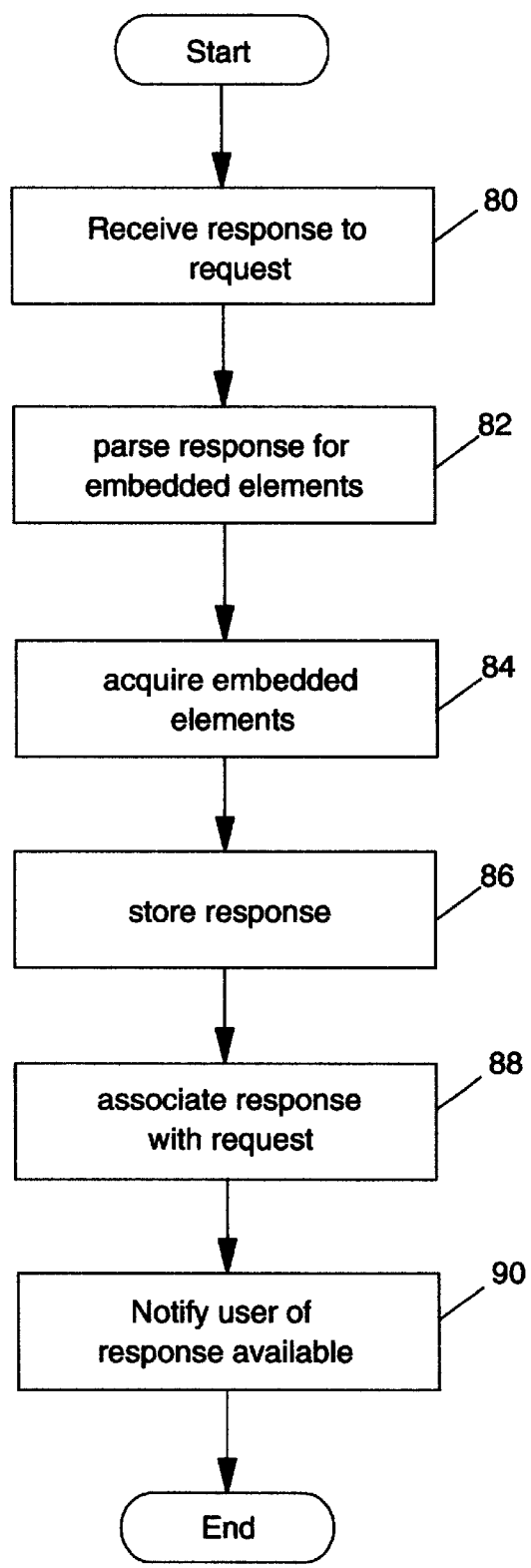
FIG. 8 is a flow chart illustrating operations associated with receiving a response to a browser request at a remote/mobile data process system according to one aspect of the present invention.

FIG. 8 illustrates the operations of the client-side intercept module and server-side intercept modules according to the present invention when a response is received to a previously queued request. As seen in FIG. 8, a response is received from the server (block 80). However, the use of graphics, applets, and other embeds is now nearly universal on Web pages. If the user has asked to see this information, the returned page is parsed for embeds (block 82). Each embed is then retrieved (block 84) and added to the cache along with the original response (block 86). The response is associated with the request in the appropriate request queue and any status information returned with the response is associated with the request (block 88). At this point the request is complete and the user can be notified that it is available (block 90). In the case of the server-side intercept, this notification may be deferred until the user is reconnected.

Because the present invention provides a transparent HTTP proxy, it will work with any browser. Queuing requests for background processing doesn't match the model that browsers expect, thus, an interim response, via HTML or an HTTP code, is returned to the browser so that the browser and the user can continue (see block 262 of FIG. 5 and block 55 of FIG. 7). Similarly, HTML pages and embedded HTML information may be used to report status to maintain browser independence.

Status of an outstanding request can be reported in any number of ways, including: an optional completion popup, an optional status bar embedded in the top of returned Web pages, or on an HTML page that summarizes the state of the queue.

The popup let users know that there is a newly completed page to view on the background page, and lists the URL of the page. One of these popups is generated the first time new information becomes available, and then further messages are suppressed until the user has visited the page and viewed the information. This allows the user to get an asynchronous completion notification without being overwhelmed on faster links.

The user may also chose to embed a status bar describing the state of the client-side intercept in each returned page. This status bar includes information on the number of requests that have been completed, the number outstanding, and the number held. It also includes a textual version of the popup stating that new results are available, and links to various generated status pages.

One of these links may take the user to a page summarizing the state of the request. The page displays the queue, one line per request. Each request includes a graphical representation of the progress that has been made processing the request, using a visual indicator such as the model of a traffic light, where:

Red: Request has not been sent

Yellow: Base page received and embed(s) pending

Green: Request complete

Graphics may also have a distinctive look apart from its color such as red being an open circle, yellow a half-moon, and green a solid ball. In case of error (e.g., the request was sent but the base page could not be retrieved), an X may be placed across the traffic light symbol to indicate failure.

Along with the status graphics, options to delete or hold a request may also be displayed. In the case of forms, the user may also view or re-edit the request. If the request has completed, a link to the cached result may also be included on this page.

In order to provide URL-based access to the background queue and other internally-generated pages, the domain name of the client-side intercept may be used (e.g. artour.web.express) coupled with other options as appropriate. For example, the background queue may be accessed accessed via the URL http://artour.web.express/HTEP/. HTTP and a reserved domain name are preferred rather than defining a proprietary protocol name for such requests because standard browsers may reject unfamiliar protocols.

Progress of request handling may also be reported to a user. Requests move through a series of states as they are processed, starting with submitted, to processing begun, to initial page retrieved, and finally to completed. As a request moves into a state, an event describing the transition may be sent to an internal event manager. The internal event manager receives status of requests and forwards status information to other components or applications. Other components may register with the event manager to receive events, filtered by event state and other criteria. Processing events can be used to generate dynamic interfaces the client-side intercept. The popup notification is one example of the use of these events.

After a response is received, the response also needs to be saved for future off-line viewing for the user. However, when a browser makes a request and receives a response, it typically handles it in one of two ways. If the response is expected to be relatively static, it is cached by the browser so that future requests to the page can be handled quickly. However, if the page is a response to a forms request, or is otherwise generated (so-called "cgi-bin" requests), the browser only displays the response, and doesn't cache it, since the response is typically different from one cgi-bin request to the next. Also, with objects that the source server marks "no-cache," browsers and proxies that observe this directive do not save these items. However, when one is retrieved as part of processing a queued request, it must be saved for later viewing.

These normally transient objects are saved (block 86) as a new category of cached information: user data. These are data that have been retrieved in response to a user request, and only have meaning in the context of that request. Unlike normal web data, user data objects are only accessible as responses on the queue status page. They are riot used to handle other requests, since they are transient time- or request-sensitive responses. User data are not subject to the normal coherency and aging algorithms used to manage the cache. They persist and are valid until deleted by the user.

Web page designers often employ HTML forms for data entry that requires only simple interaction. HTML form tags provide a convenient way for building electronic forms for Web interaction. HTML form tags allow a Web user to make selections from a list, to check on/off boxes, to select from radio buttons, to enter text into a text field or a large multi-line text area, and to push action buttons. When the user presses an action button, the entered data is sent to a Web server designated by the action with name/value pairs, where each name represents an input field and each value represents the user's input in the field. In addition, there may be hidden fields, which carry preset values that a Web server sent along with the form. These hidden values are sent back to the server together with the values in visible fields.

Like any HTML page, an HTML form can be cached for future use. According to the present invention, a cached HTML form may be edited for submission later or resubmission again with different user input. For example, a search input form could be edited again and again to send out different search requests. Similarly, an intranet data entry form such as a patient admission form could be edited to correct data entry errors, or resubmitted with new data for a different patient. Most forms can be meaningfully cached for independent future submission because they either have a simple one-form interaction model or contain self-sufficient hidden fields so that the Web application can accept a submission in isolation.

In a mobile environment, disconnected form submission can extend the productivity of users even when a server is not reachable. This allows multiple data entry pages to be filled without connecting to any network. Also, with the re-editing function of the present invention, a user can draft a few forms and have a chance to review, approve, or edit them before they finally are sent to the server.

As described above, a form may be treated as any HTML page and the operations of FIG. 5 or FIG. 7 carried out to create an entry in the request queue corresponding to the filled out form. Like regular HTML pages, the user obtains a cached HTML form using a URL. The user fills in the form and submits it using one of the action buttons. When a form is submitted, the name/value pairs together with the originating form URL are stored and queued. If the user requests the same URL form again and submits a new result, the new submission is kept separate from the previous submission. Every submission is counted as a separate entry in the queue for automatic submission when a connection becomes available. These entries remains stored until they are deleted by a user.

Figure 9:
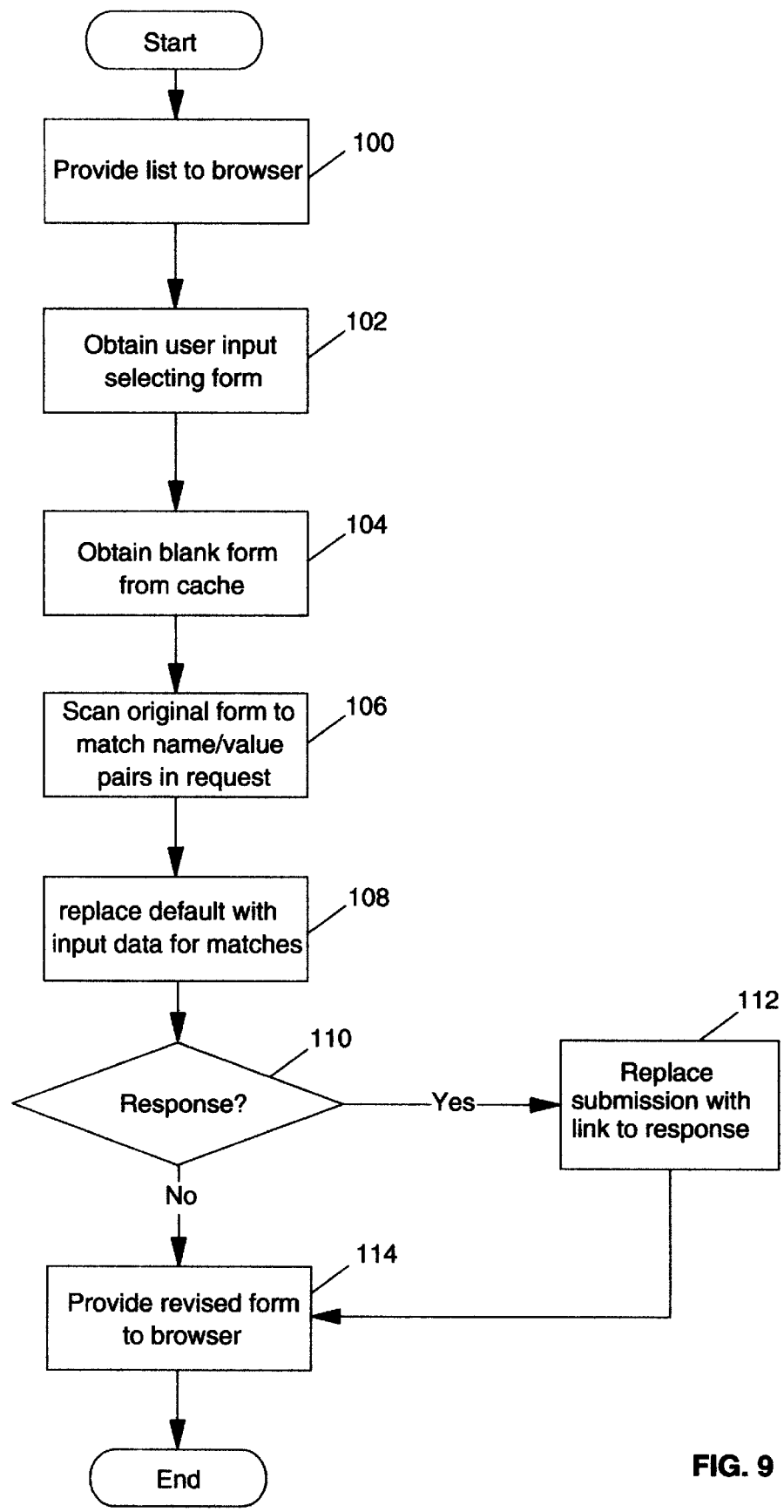
FIG. 9 is a flow chart illustrating operations associated with revising a request according to one aspect of the present invention.

FIG. 9 illustrates the re-editing process of forms utilizing the present invention. This reediting utilizes the forms in the queue of FIG. 7. As seen in FIG. 9, a list of available forms in the queue is provided to the browser (block 100) and user input selecting a queue entry is obtained (block 102). An HTML page may be presented to the user to display the entries in the queue which may be accessed using hyperlinks.

Based on the user input a form corresponding to the URL of the form used to generate the queued request is obtained from the local cache (block 104). The base form may be retrieved based on previously inserted data indicating the origin of the form. When the blank form is first fetched from the server, the client-side intercept inserts hidden values into the HTML before returning the page to the browser. The hidden information includes both the originating URL and the form number within the page. To re-edit the form, the blank form is retrieved using the hidden value containing the form's URL which is stored with the request in the request queue to associate the request with the form that generated the request.

The form and the queued request are scanned to match name/value pairs in the request (block 106). If any match is found, the default selection or input value is then changed to reflect the user's submission (block 108). Special care should be taken with Web pages that consist of multiple HTML forms, since they may use the same field names in different subforms. Thus, subforms are assigned a unique identifier to track them. The original input form and data are then reconstructed. If a response to request has already been received, (block 110) then, optionally, the submission button may be replaced by a link to the response so that the user may view the results of the submission (block 112). Otherwise, the reconstructed request is provided to the browser for editing by the user (block 114). If resubmitted the existing queue entry may be overwritten with the new data, or, optionally, the user could select that a new entry in the queue is provided. Such a feature would allow the user to use a filled out form as a template for creating additional requests with similar data with only minor further input.

As described above, if a request is modified by a client, that modification is provided to the server-side intercept as part of a management function. Furthermore, while the revision operations of FIG. 9 are preferably carried out at the client-side, these procedures could also be implemented on the server-side of the communication link.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for communicating with a web browser utilizing a request-response communications mechanism and executing on a first data processing system which is temporarily and intermittently connected to a second data processing system, said method comprising the steps of:

determining if the request received from the web browser to the server application is a delayed processing request;

storing in a persistent request queue at the second data processing system, a request from the web browser to a server application accessible to the second data processing system if the request received from the web browser is a delayed processing request;

providing an interim response to the web browser in response to the request from the web browser irrespective of whether a response to the request has been received from the server application so as to provide a response to the web browser request if the request received from the web browser is a delayed processing request;

providing the request to the server application;

receiving the response from the server application;

providing the received response to the web browser executing on the first data processing system in response to the request if the request is not a delayed processing request and in response to a subsequent request if the request is a delayed processing request.

2. A method according to claim 1, wherein said step of providing an interim response is followed by the step of disconnecting the first data processing system from the second data processing system and said step of providing the received response to the web browser is preceded by the step of reconnecting the first data processing system to the second data processing system.

3. A method according to claim 2, further comprising the steps of:

providing a list of stored requests to the web browser for presentation to a user;

receiving from the web browser a request for a selected one of the stored requests in the list of stored requests; and providing to the web browser, the associated response to a selected one of the list of stored requests based upon user input.

4. A method according to claim 2, further comprising the steps of:

notifying the user of the availability of the received response subsequent to the response being received by the second data processing system; and providing the response to the web browser if the user requests the response.

5. A method according to claim 2, wherein said step of storing in a persistent request queue is preceded by the step of establishing a persistent request queue associated with a user identifier and wherein said step of reconnecting the first data processing system comprises the steps of:

connecting the first data processing system to the second data processing system; and receiving from the first data processing system a user identifier; and wherein said step of providing the received response comprises the step of providing the received response to the request from the persistent request queue associated with the received user identifier.

6. A method according to claim 5, further comprising the steps of:

parsing the received response to determine if at least one request is embedded in the received response;

providing the at least one embedded request in the received response to a server specified by the embedded request;

receiving a response to the embedded request;

storing the received response to the embedded request at the second data processing system; and associating the stored received response to the embedded request with the request stored in the persistent request queue; and wherein said step of providing the received response to the web browser comprises providing the stored received response and the stored response to the embedded request to the web browser.

7. A method according to claim 5 further comprising the steps of:

storing the response to the request at the second data processing system; and associating the stored response with the stored request in the persistent request queue associated with the user identifier.

8. A method according to claim 7, wherein said step of establishing a persistent request queue comprises the step of establishing a plurality of persistent request queues wherein each of the persistent request queues is associated with a user identifier; and wherein said step of storing in a persistent request queue comprises the step of storing requests from a plurality of web browsers in the plurality of persistent request queues such that requests from a user of a web browser are stored in the one of said persistent request queues associated with the user identifier of the user; and wherein said step of providing the stored request to the server application comprises the step of providing the plurality of requests to associated web servers;

wherein said step of receiving a response from the server application comprises the step of receiving a plurality of responses from the associated web servers; and wherein said step of providing the received response to the web browser executing on the first data processing system comprises the step of providing the received plurality of responses to the plurality of web browsers such that a response to a request is provided to the web browser from which the request was received.

9. A method according to claim 1, further comprising the steps of:

associating a plurality of responses from servers with a single entry in the persistent request queue; and providing the plurality of responses associated with the single entry in the persistent request queue to the first data processing system.

10. A method for communicating with a web browser utilizing a request-response communications mechanism and executing on a first data processing system which is temporarily and intermittently connected to a second data processing system, said method comprising the steps of:

storing in a persistent request queue at the second data processing system, a request from the web browser to a server application accessible to the second data processing system;

providing an interim response to the web browser in response to the request from the web browser irrespective of whether a response to the request has been received from the server application so as to provide a response to the web browser request;

associating a client identification with the stored request;

providing the stored request to the server application;

receiving the response from the server application;

storing the received response from the server in a server-side cache resident on the second data processing system;

associating the stored received response with the stored request;

notifying a user of the availability of the stored received response subsequent to the response being received by the second data processing system; and providing the stored received response to a web browser associated with the client identification associated with the stored request if the user requests the stored received response.

11. A method according to claim 10, wherein said step of providing the stored received response to a web browser associated with the client identification associated with the stored request comprises the step of providing the stored received response to a web browser associated with the client identification associated with the stored request during a subsequent connection.

12. A method according to claim 10, further comprising the steps of:

receiving a modification of the request prior to said step of providing the stored request to the server application; and revising the request stored in the request queue to replace the stored request with the modified request.

13. A method according to claim 10, further comprising the step of determining if a request received from the browser is a delayed processing request and wherein said step of storing in a persistent request queue is selectively carried out if said determining step determines that the received request is a delayed processing request.

14. A method according to claim 10, further comprising the steps of:

providing a list of stored requests to the web browser for presentation to a user;

receiving from the web browser a request for a selected one of the stored requests in the list of stored requests; and wherein said step of providing the stored received response to a web browser associated with the client identification associated with the stored request comprises the step of providing to the web browser, the associated stored response to the selected one of the list of stored requests based upon user input.

15. A method according to claim 10, further comprising the steps of:

parsing the received response to determine if at least one request is embedded in the received response;

providing the at least one embedded request in the received response to a server specified by the embedded request;

receiving a response to the embedded request;

storing the received response to the embedded request in the cache resident on the second data processing system; and associating the stored received response to the embedded request with the request stored in the persistent request queue; and wherein said step of providing the received response to the web browser comprises providing the stored received response and the stored response to the embedded request to the web browser.

16. A method according to claim 10, wherein said step of storing in a persistent request queue comprises the step of storing requests from a plurality of web browsers in a plurality of persistent request queues such that requests from a user of a web browser are stored in the one of said persistent request queues associated with the client identification associated with the stored requests;

wherein said step of providing the stored request to the server application comprises the step of providing the plurality of stored requests to associated web servers;

wherein said step of receiving a response from the server application comprises the step of receiving a plurality of responses from the associated web servers; and wherein said step of providing the received response to the web browser executing on the first data processing system comprises the step of providing the received plurality of responses to the plurality of web browsers such that a response to a request is provided to the web browser corresponding to the client identification associated with the stored request.

17. A method according to claim 10, further comprising the steps of:

associating a plurality of responses from servers with a single entry in the persistent request queue; and providing the plurality of responses associated with the single entry in the persistent request queue to the first data processing system.

18. A system for communicating with a web browser utilizing a request-response communications mechanism and executing on a first data processing system which is temporarily and intermittently connected to a second data processing system, comprising:

means for determining if a request received from the browser is a delayed processing request;

means for storing in a persistent request queue at the second data processing system, a request from the web browser to a server application accessible to the second data processing system if the request received from the web browser is a delayed processing request;

means for providing an interim response to the web browser in response to the request from the web browser irrespective of whether a response to the request has been received from the server application so as to provide a response to the web browser request if the request received from the web browser is a delayed processing request;

means for providing the request to the server application;

means for receiving the response from the server application;

means for providing the received response to the web browser executing on the first data processing system in response to the request from the web browser if the request is not a delayed processing request and in response to a subsequent request from the web browser if the request is a delayed processing request.

19. A system according to claim 18, further comprising:

means for disconnecting the first data processing system from the second data processing system; and means for reconnecting the first data processing system to the second data processing system.

20. A system according to claim 19, further comprising:

means for providing a list of stored requests to the web browser for presentation to a user;

means for receiving from the web browser a request for a selected one of the stored requests in the list of stored requests; and means for providing to the web browser, the associated response to a selected one of the list of stored requests based upon user input.

21. A system according to claim 19, further comprising:

means for notifying the user of the availability of the received response subsequent to the response being received by the second data processing system; and means for providing the response to the web browser if the user requests the response.

22. A system according to claim 19, further comprising:

means for establishing a persistent request queue associated with a user identifier; and wherein said means for reconnecting the first data processing system comprises:
means for connecting the first data processing system to the second data processing system; and
means for receiving from the first data processing system a user identifier; and wherein said means for providing the received response comprises means for providing the received response to the request from the persistent request queue associated with the received user identifier.

23. A system according to claim 22, further comprising:

means for parsing the received response to determine if at least one request is embedded in the received response;

means for providing the at least one embedded request in the received response to a server specified by the embedded request;

means for receiving a response to the embedded request;

means for storing the received response to the embedded request at the second data processing system; and means for associating the stored received response to the embedded request with the request stored in the persistent request queue; and wherein said means for providing the received response to the web browser comprises means for providing the stored received response and the stored response to the embedded request to the web browser.

24. A system according to claim 22 further comprising:

means for storing the response to the request at the second data processing system; and means for associating the stored response with the stored request in the persistent request queue associated with the user identifier.

25. A system according to claim 24, wherein said means for establishing a persistent request queue comprises means for establishing a plurality of persistent request queues wherein each of the persistent request queues is associated with a user identifier; and wherein said means for storing in a persistent request queue comprises means for storing requests from a plurality of web browsers in the plurality of persistent request queues such that requests from a user of a web browser are stored in the one of said persistent request queues associated with the user identifier of the user; and wherein said means for providing the stored request to the server application comprises means for providing the plurality of requests to associated web servers;

wherein said means for receiving a response from the server application comprises means for receiving a plurality of responses from the associated web servers; and wherein said means for providing the received response to the web browser executing on the first data processing system comprises means for providing the received plurality of responses to the plurality of web browsers such that a response to a request is provided to the web browser from which the request was received.

26. A system according to claim 18, further comprising:

means for associating a plurality of responses from servers with a single entry in the persistent request queue; and means for providing the plurality of responses associated with the single entry in the persistent request queue to the first data processing system.

27. A computer program product for communicating with a web browser utilizing a request-response communications mechanism and executing on a first data processing system which is temporarily and intermittently connected to a second data processing system, the computer program product comprising:

computer-readable program code means for determining if a request received from the web browser is a delayed processing request;

computer-readable program code means for storing in a persistent request queue at the second data processing system, a request from the web browser to a server application accessible to the second data processing system if the request received from the web browser is a delayed processing request;

computer-readable program code means for providing an interim response to the web browser in response to the request from the web browser irrespective of whether a response to the request has been received from the server application so as to provide a response to the web browser request if the request received from the web browser is a delayed processing request;

computer-readable program code means for providing the request to the server application;

computer-readable program code means for receiving the response from the server application;

computer-readable program code means for providing the received response to the web browser executing on the first data processing system in response to the request from the web browser if the request is not a delayed processing request and in response to a subsequent request from the web browser if the request is a delayed processing request.

28. A computer program product according to claim 27, further comprising:

computer-readable program code means for disconnecting the first data processing system from the second data processing system; and computer-readable program code means for reconnecting the first data processing system to the second data processing system.

29. A computer program product according to claim 28, further comprising:

computer-readable program code means for providing a list of stored requests to the web browser for presentation to a user;

computer-readable program code means for receiving from the web browser a request for a selected one of the stored requests in the list of stored requests; and computer-readable program code means for providing to the web browser, the associated response to a selected one of the list of stored requests based upon user input.

30. A computer program product according to claim 28, further comprising:

computer-readable program code means for notifying the user of the availability of the received response subsequent to the response being received by the second data processing system; and computer-readable program code means for providing the response to the web browser if the user requests the response.

31. A computer program product according to claim 28, further comprising:

computer-readable program code means for establishing a persistent request queue associated with a user identifier; and wherein said computer-readable program code means for reconnecting the first data processing system comprises:

computer-readable program code means for connecting the first data processing system to the second computer; and computer-readable program code means for receiving from the first data processing system a user identifier; and wherein said computer-readable program code means for providing the received response comprises computer-readable program code means for providing the received response to the request from the persistent request queue associated with the received user identifier.

32. A computer program product according to claim 31 further comprising:

computer-readable program code means for storing the response to the request at the second data processing system; and computer-readable program code means for associating the stored response with the stored request in the persistent request queue associated with the user identifier.

33. A computer program product according to claim 32, wherein said computer-readable program code means for establishing a persistent request queue comprises computer-readable program code means for establishing a plurality of persistent request queues wherein each of the persistent request queues is associated with a user identifier; and wherein said computer-readable program code means for storing in a persistent request queue comprises computer-readable program code means for storing requests from a plurality of web browsers in the plurality of persistent request queues such that requests from a user of a web browser are stored in the one of said persistent request queues associated with the user identifier of the user; and wherein said computer-readable program code means for providing the stored request to the server application comprises computer-readable program code means for providing the plurality of requests to associated web servers;

wherein said computer-readable program code means for receiving a response from the server application comprises computer-readable program code means for receiving a plurality of responses from the associated web servers; and wherein said computer-readable program code means for providing the received response to the web browser executing on the first data processing system comprises computer-readable program code means for providing the received plurality of responses to the plurality of web browsers such that a response to a request is provided to the web browser from which the request was received.

34. A computer program product according to claim 31, further comprising:

computer-readable program code means for parsing the received response to determine if at least one request is embedded in the received response;

computer-readable program code means for providing the at least one embedded request in the received response to a server specified by the embedded request;

computer-readable program code means for receiving a response to the embedded request;

computer-readable program code means for storing the received response to the embedded request at the second data processing system; and computer-readable program code means for associating the stored received response to the embedded request with the request stored in the persistent request queue; and wherein said computer-readable program code means for providing the received response to the web browser comprises computer-readable program code means for providing the stored received response and the stored response to the embedded request to the web browser.

35. A computer program product according to claim 27, further comprising:

computer-readable program code means for associating a plurality of responses from servers with a single entry in the persistent request queue; and computer-readable program code means for providing the plurality of responses associated with the single entry in the persistent request queue to the first data processing system.

\* \* \* \* \*